Figure 1:
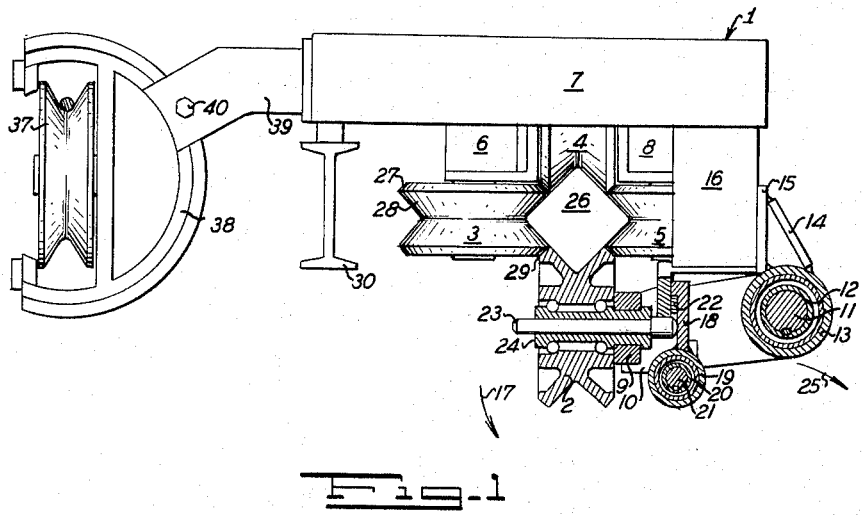

March 22, 1966     S. BARTSCH     3,241,497

SUSPENSION RAIL TRUCK CABLE GUIDE ARRANGEMENT

Filed Jan. 23, 1964     4 Sheets-Sheet 1

INVENTOR
SIEGFRIED BARTSCH

BY
ATTORNEYS

March 22, 1966      S. BARTSCH      3,241,497
SUSPENSION RAIL TRUCK CABLE GUIDE ARRANGEMENT
Filed Jan. 23, 1964      4 Sheets-Sheet 2

INVENTOR
SIEGFRIED BARTSCH
BY Burgess Dinklage Sprung
ATTORNEYS

March 22, 1966     S. BARTSCH     3,241,497
SUSPENSION RAIL TRUCK CABLE GUIDE ARRANGEMENT
Filed Jan. 23, 1964     4 Sheets-Sheet 3
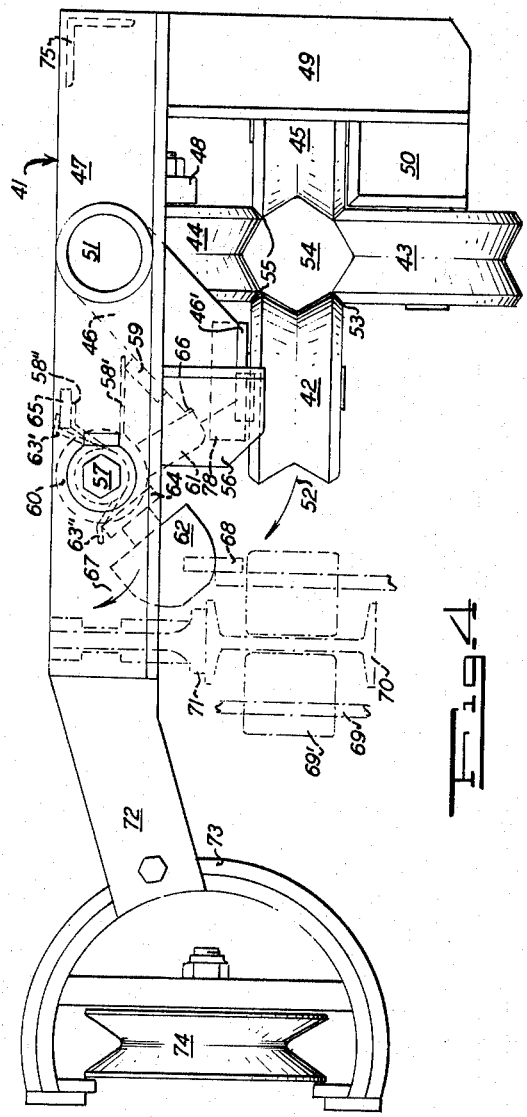
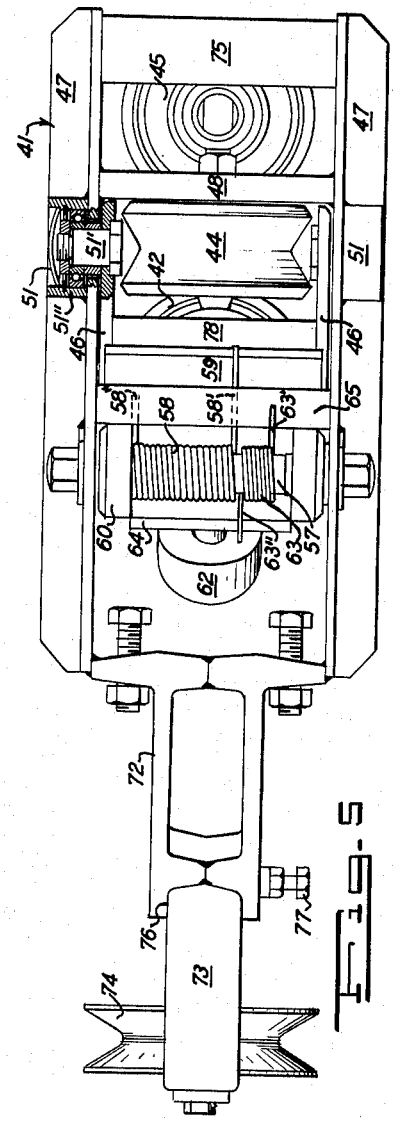
INVENTOR
SIEGFRIED BARTSCH
BY
ATTORNEYS March 22, 1966　　　S. BARTSCH　　　3,241,497
SUSPENSION RAIL TRUCK CABLE GUIDE ARRANGEMENT
Filed Jan. 23, 1964　　　　　　　　　　4 Sheets-Sheet 4

INVENTOR
SIEGFRIED BARTSCH
BY
ATTORNEY

United States Patent Office 3,241,497
Patented Mar. 22, 1966

3,241,497
SUSPENSION RAIL TRUCK CABLE GUIDE
ARRANGEMENT
Siegfried Bartsch, Bockum-Hovel, Kreis Luding-
hausen, Germany, assignor to Maschinenfabrik
Scharf G.m.b.H., Hamm, Westphalia, Germany
Filed Jan. 23, 1964, Ser. No. 341,164
Claims priority, application Germany, Jan. 31, 1963,
Sch 32,686
16 Claims. (Cl. 104—182)

The present invention relates to a suspension rail truck cable guide arrangement, and more particularly to a traction cable guide for a work truck or load truck which is suspension-mounted upon an overhead rail, such as that employed in underground mining operations.

In the past, overhead suspended railway arrangements, especially those employed in underground mining operations, were beset with various disadvantages. In this regard, the traction cable used to drive or convey the truck along the rail in the mine shaft or mineway must be able to negotiate various displacements from its normal path of travel in longitudinal direction, due to the fact that curves, as well as uphill and downhill paths are encountered in mine shafts and mineways. However, the rail and traction cable for driving or conveying the truck should also be able to follow the various tortuous paths, but in practice heretofore the traction cable often became obstructed along the course of its travel since insufficient guiding means were provided, especially at curves where the gallery or mineway dips, rises, or alternates in direction.

A cable guiding arrangement has already been proposed in which the cable is guided in a closed roller box, such that the passage through the closed roller box of the carriage trolley arm fastened to the moving cable is made possible by constructing one roller in the closed roller box as a toothed roller. While the carriage trolley arm may be accommodated between the teeth of such roller during passage through the roller box, the arrangement is susceptible to difficulties, especially where the trolley arm connection is operated or conducted by the cable at relatively high speed, inasmuch as the shocks that occur when the trolley arm passes through the roller box between the teeth of the toothed roller cause rapid wear of such toothed roller.

It is an object of the present to overcome the foregoing drawbacks and to provide a suspension rail truck cable guide arrangement which permits the efficient and unobstructed guiding of the traction cable for the truck regardless of the tortuous nature of the particular mine shaft or mineway involved.

It is another object of the present invention to provide a traction cable guide for a truck suspension-mounted upon an overhead rail and conducted along such rail by a traction cable connected thereto, in which the traction cable is prevented from escaping from its retention by the guide means and from jamming of such guide means.

It is still another object of the present invention to provide a traction cable guide arrangement of the foregoing type which permits the connection between the truck and traction cable to pass along the normal path of travel of the cable through the cable guide arrangement without obstruction.

Figure 2:
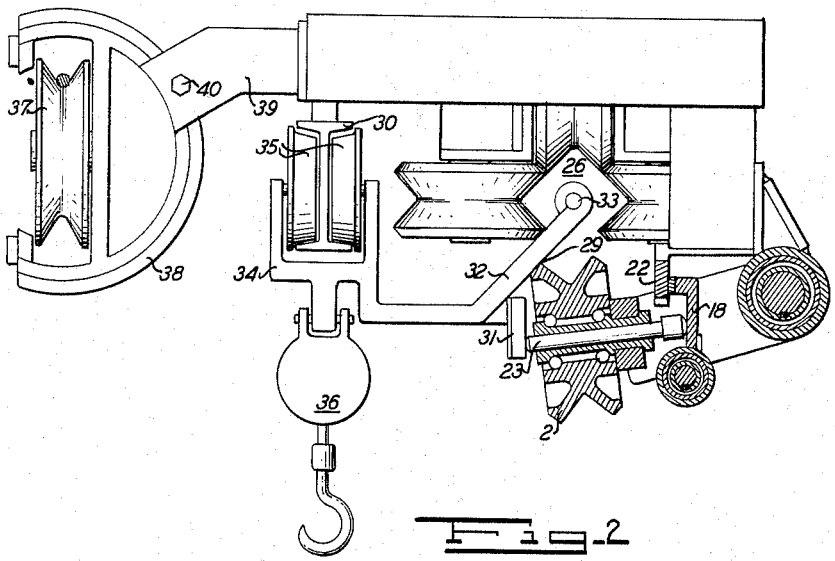
Figure 5:
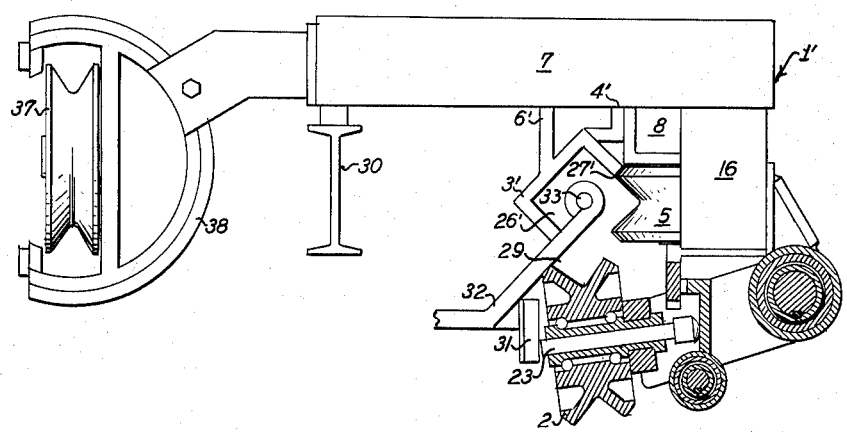
Figure 6:
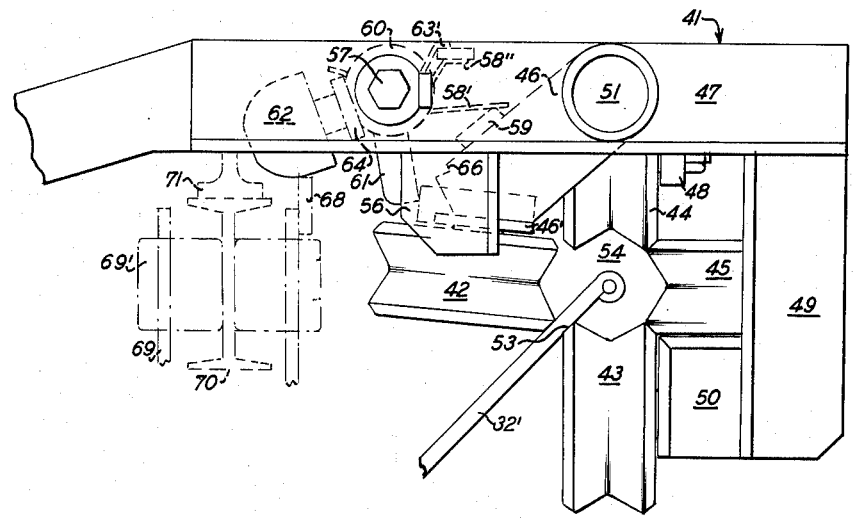
Figure 7:
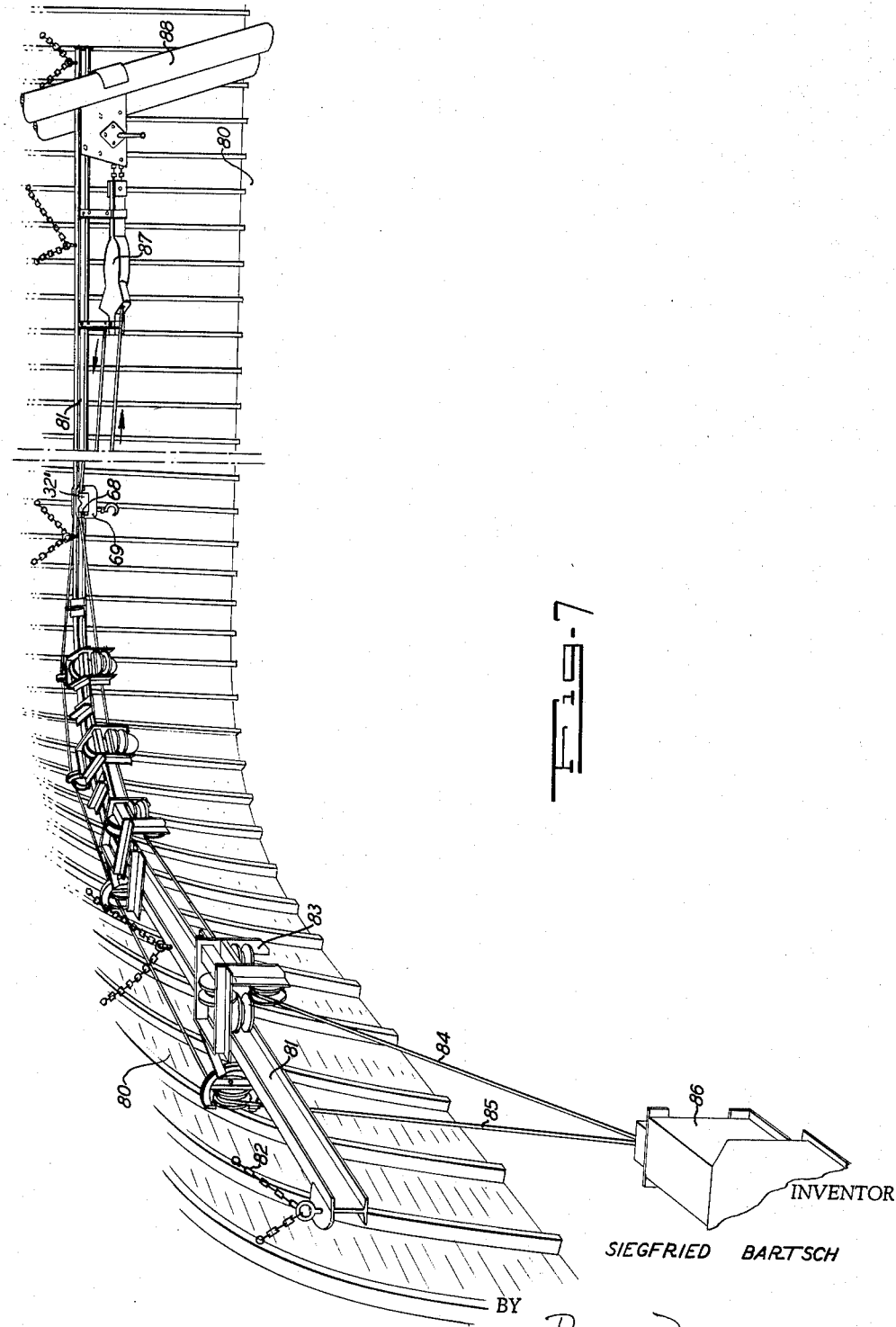

Other and further objects of the present invention will become apparent from a study of the within specification and accompanying drawings, in which:

FIG. 1 is a schematic end view partially in section of a suspension rail truck cable guide arrangement in accordance with one embodiment of the invention illustrating the manner in which the traction cable will be efficiently guided and retained along its normal path, FIG. 2 is a schematic end view partially in section of the arrangement of FIG. 1, showing a downwardly displaceable roller in open position to permit the connection between the truck and traction cable to pass along the normal path of travel through the cable guide arrangement without obstruction with the adjacent parts, FIG. 3 is a schematic view partially in section of an alternate embodiment of traction cable guide means in accordance with the invention in which only two rollers are provided, FIG. 4 is a schematic end view partially in section of a suspension rail truck cable guide arrangement in accordance with another embodiment of the invention, FIG. 5 is a schematic top view partially in section of the embodiment of FIG. 4 showing details of construction of the displaceable roller arrangement, FIG. 6 is a schematic end view of the arrangement of FIG. 4 showing the laterally displaceable roller in open position, and FIG. 7 is a schematic perspective view of a mine tunnel section showing the manner in which the guide arrangements of the invention are used.

It has been found in accordance with the present invention that an efficient suspension rail truck cable guide arrangement may be provided which will permit the truck arm connected to such cable to pass through the guide means without obstruction. Specifically, the traction cable guide, for the truck which is suspension-mounted upon an overhead rail and driven along such rail by a traction cable connected thereto, includes a roller box having traction cable guide means disposed in a transverse plane with respect to the path of travel of the traction cable and positioned for surrounding and guidingly engaging the traction cable to maintain such cable in a substantially predetermined path through said transverse plane. The cable guide means includes at least one displaceable roller mounted on the roller box with the axis of rotation of such displaceable roller being disposed in the transverse plane. In this way, the displaceable roller which is normally urged into closed position for guiding engagement with the traction cable thereat may be moved to open position upon the passage of the truck thereby with sufficient clearance between the displaceable roller and the adjacent guide means portions to permit the trolley arm connection or other connection means extending between the truck and traction cable to pass along the path of travel through the transverse plane at the particular roller box without obstruction with the displaceable roller and in turn the adjacent portions of the cable guide means thereat.

The displaceable roller is preferably pivotably mounted on its axis at a point remote from the path of travel of the traction cable so as to permit the displaceable roller to swing to open position with the required clearance between the roller and the adjacent guide means portions. A locking mechanism is advantageously provided for the displaceable roller, such locking mechanism having release means situated in the path of travel of the truck, i.e. usually prior to the point in such path where the connection between the truck and traction cable reaches said displaceable roller, for release of the locking mechanism and in turn movement of the displaceable roller to open position only upon engagement of the truck with the release means, so that such truck may pass in an unhindered manner along such path. Urging means are also suitably provided in operative connection with the displaceable roller to thereby normally urge the displaceable roller into closed position, yet yieldably permitting movement of the roller to open position, i.e., for instance once said release means have been engaged by such truck, for passage of the truck connection therepast under the force of such connection between the truck and traction cable.

The urging means generally comprise resilient urging means, and may be used in the form of spring means, such as coil spring means, or other means for effecting a rapid return of the displaceable roller to the closed position or rest position. Besides the use of a spring to contribute the restoring force necessary, a force may be provided in any other form as will be appreciated by the artisan such as in the form of an electromagnet, or a hydraulic or pneumatic apparatus, or the like, whereby a counter force may be exerted resiliently to restore the displaceable roller to its normal closed position in order to prevent the cable from escaping from the roller box guide means after the trolley connection of the truck with the cable passes therethrough.

Of course, such displaceable roller is situated in the transverse plane of the roller box, and preferably either under the path of the traction cable for supporting contact with the under side of the cable, or laterally of such path for unilateral supporting contact of said roller with the appropriate lateral side of the cable.

In accordance with one embodiment of the invention, the adjacent portions of the cable guide means include three additional fixed position or stationary position rollers having their axes of rotation disposed in the transverse plane of the roller box such that when the displaceable roller is in closed position, the peripheries of all of the rollers surround completely the path of the traction cable with the periphery of one roller being immediately adjacent the next and at a maximum distance apart less than the diameter of the cable to be accommodated whereby to prevent escape of the cable therebetween and jamming of such cable thereat.

Alternately, in accordance with another embodiment of the invention, the adjacent portions of the cable guide means include fixed position or stationary position deflector means in such transverse plane, so that when the displaceable roller is in closed position, the cable guide means including the fixed deflector means and such displaceable roller will surround completely the path of the traction cable with the periphery of the displaceable roller being immediately adjacent the corresponding portions of the cable guide means including the fixed deflector means and at a maximum distance therefrom less than the diameter of the cable to be accommodated to prevent escape of the cable therebetween and jamming of such cable thereat.

Referring to the drawing, FIG. 1 shows a cable guide means roller box 1 having four guide rollers 2, 3, 4, and 5, disposed in cruciform arrangement, the guide rollers being journalled appropriately onto the brackets 6 and 8, the box top member 7 and the box side member 16, as the case may be. The brackets 6 and 8, of course, are connected to the top member 7, the bracket 8 also being connected to the side member 16. The axes of rollers 3 and 5 are vertically disposed in parallel relationship in a transverse plane passing through the roller box guide arrangement. The rollers 3 and 5 are maintained in the same horizontal plane in spaced alignment with one another. On the other hand, the rollers 2 and 4 are maintained in a vertical plane in spaced alignment with one another, such that their axes of rotation are horizontal and parallel with one another, as well as disposed in the transverse plane passing through the roller box arrangement.

In the case of roller 2, the mounting arrangement is somewhat different from that of rollers 3, 4, and 5 inasmuch as roller 2 is a displaceable roller mounted on an arm 9 of the lever member 10 having an axis of rotation 11 suitably journalled in a sleeve 13 carried by the plates 14 and 15 which, in turn, are mounted on the box side member 16. A resilient material 12, such as a coil spring, or a rubber sleeve or collar, is mounted between the axis 11 and the sleeve 13 so as to normally urge the lever arm 10 and in turn the displaceable roller 2 in upward direction, such that the roller 2 closes the bottom portion of the cable path 26 surrounded by the four rollers. The displaceable roller 2 is movable from the closed position shown in FIG. 1 downwardly in the direction of the arrow 17 to the position shown in FIG. 2. Normally, a locking mechanism is used to keep displaceable roller 2 in closed position, the locking mechanism including a latch 18 pivotally mounted by means of a sleeve 19 upon an axis 21 connected to the lever member 10 with a resilient member 20 similarly in the form of a coil spring, or a rubber sleeve or collar, normally urging the sleeve 19 and in turn the latch 18 into closed position. When in closed position, the latch 18 engages a stop 22 on the under side of the box side member 16. A plunger 23 is provided in the journal shaft 24 of displaceable roller 2, such journal shaft being connected with the arm 9 of the lever member 10. The plunger 23 is mounted for axial displacement so that its head will engage the latch 18 against the force of the resilient means 20 to permit the latch 18 to move in the direction of arrow 25 whereby the lever member 10, and in turn, the displaceable roller 2 may be downwardly moved in the direction of arrow 17.

It will be seen from FIG. 1 that each roller is provided with a periphery or margin 27 at each outermost side portion which is at an angle of about 45° to the next adjacent roller side portion, so that the adjacent portions of the four rollers in cruciform arrangement may be advantageously situated without a gap therebetween which might cause the cable to escape from the retained path 26. Additionally, the central or medial portion 28 of each roller is fashioned in the form of a V-groove so that the desired retained path 26 may be properly formed with sufficient room to prevent obstruction and to allow the connecting trolley arm of the truck carried on the suspension rail 30 to pass through the gap 29 when the displaceable roller 2 is moved to open position.

This situation is covered in FIG. 2, wherein it is seen that the roller 2 is downwardly displaced due to the passage of the projection bar 31 across the jutting end of plunger 23 which latter element acts as a release means for latch 18 with respect to stop 22. The projection bar 31, of course, precedes the carrier trolley connecting arm 32 along the path of travel by an adequate linear distance so that when the arm 32 strikes rollers 2 and 3 at the gap 29, the latch 18 will have just been released from stop 22 whereby roller 2 will be downwardly displaced against the resilient force a sufficient distance to permit the arm 32 to pass through the transverse plane of the roller box. Since the cable 33 is attached to the free end of the arm 32, as the cable is conducted along the path 26, such cable will carry along therewith not only the connecting arm 32 but also the main truck 34. Truck 34 is mounted by means of wheels 35 in the suspension rail 30, with the winch arrangement 36 or any other load attachment or work attachment or tool depending therefrom, as desired.

Accordingly, the truck 34 may be suitably conducted along the overhead suspension rail 30 in the desired manner and the driving cable 33 therefor will be able to negotiate changes in the direction of the path of travel of the truck without obstruction due to the efficient guidance of the roller box guide means of the invention, without any possible escape of the cable from within the roller box guide means or jamming of the cable in the space between the respective rollers.

As may be seen in FIGS. 1 and 2, a roller 37 is provided for the return section of the cable 33, and in accordance with the features of the present invention such roller 37 is mounted in a curved frame 38, which, in turn, is displaceably mounted in an angle arm 39. Specifically, angle arm 39 is provided with a groove at its free end to accommodate the frame 38, so that the frame 38 may be displaced with respect thereto for changing the angle of the axis of roller 37 with respect to the horizontal. The frame 38 may be releasably fixed in position by means of the lock nut 40 on arm 39. Accordingly, where uneven portions of the mine tunnel are encountered, the load of the return cable may be suitably accommodated by means of the roller 37 due to the slidable displacement of frame 38 within the groove (not shown) of arm 39. This feature adds to the efficient guiding of the cable in question along the return section thereof, whereby undue friction and wear will be avoided and undesired movement of the cable from its normal path will be completely avoided, regardless of the tortuous path of the cable in the mine tunnel.

In the case of the embodiment of FIG. 3, a similar arrangement 1' is shown, except that a deflector member 3' is used in place of rollers 3 and 4, the deflector 3' having a similar cross-sectional shape to that of the roller arrangement of the stationary or fixed position rollers 3 and 4 of FIG. 1. The deflector member 3' is conveniently attached to the roller box top member 7 by depending arm 6' and angle arm 4', angle arm 4' being braced in part against bracket 8, with the rest of the parts of the construction remaining the same. The displaceable roller 2 in this case will abut when in closed position the adjacent lower portions of deflector member 3' and stationary roller 5, while the stationary roller 5 will be closely adjacent the upper end portion of deflector member 3' at periphery 27'. Roller 2 will be downwardly displaced to open position when the projection bar 31 strikes the plunger member 23 to release the locking mechanism, so that when the connecting arm 32 strikes the gap 29, roller 2 will be downwardly urged against the resilient force thereof to permit the arm 32 to pass along the path of travel 26' with the cable 33 without obstruction with the adjacent parts of the roller box guide arrangement. Once having passed, the resilient force of the displaceable roller 2 will cause the upward pivoting of such roller to the closed position in the same manner as is true with the embodiment of FIGS. 1–2. By reason of the resilient arrangement of the lever member for the pivotable or displaceable roller 2 and the resilient arrangement of the latch of the locking means, after passage of the truck and connecting arm arrangement through the roller box guide means of the invention, the lever member and the latch will automatically return to their normal closed positions. As aforesaid, of course, the rubber or spring resilient connection for the latch of the locking mechanism and the lever member of the displaceable roller may be replaced by other suitable resilient urging means capable of providing the desired restoring force, such as an electromagnet arrangement or a hydraulic or pneumatic system, or the like, as the artisan will appreciate, all of such urging means serving to close once more completely the roller box guide means around the traction cable after the passage of the truck and connecting arm to prevent unintentional and undesired escape of the cable from its normal path. It will be seen, of course, that this is especially important where the roller box guide arrangement is situated itself at a curve in the path of the truck and cable in a mineway.

In accordance with an alternate embodiment of the invention, as shown in FIGS. 4 and 5, a cable guide means roller box 41 is shown having four guide rollers 42, 43, 44, and 45. Roller 42 is a laterally displaceable roller which is mounted for displacement in the direction of arrow 52 by means of brackets 46, whereas stationary roller 44 is mounted for rotation by means of bracket 48, bracket 48 and brackets 46 being in turn carried by the box top members 47. On the other hand, stationary roller 45 and stationary roller 43 are journalled onto the bracket 50 which is carried by the box side member 49. The cruciform arrangement of the rollers with their peripheral portions 55 being adjacent one another provides suitable peripheral guidance of the cable in the path 54.

With respect to the displaceable roller 42, the same is journalled by means of a plate 46' onto the lower end portions of the brackets 46 and at the same time the brackets 46 are journalled at pivot means 51 carried by the top members 47 as may be seen more clearly in FIG. 5. The brackets 46 are interconnected by a brace 59 and at the lower end portion of each bracket 46 a recess 66 is provided to accommodate the locking member 61. In this connection, a shaft 57 is journalled between top members 47 and carries a large coil spring 58 (see FIG. 5) having a long end 58' disposed under tension on brace 59 and a short end 58'' disposed under tension against the under side of brace 65 extending between top members 47 (see FIG. 5).

Additionally, a coil spring 63 of smaller dimensions than coil spring 58 is provided on a separate portion of shaft 57 and has one end 63' under tension against the upper side of brace 65, the other end 63'' being placed under tension against a plate 64 of the partial cylindrical element 60. Cylindrical element 60 is mounted on shaft 57 for rotation thereon and carries a release element 62 connected to element 60 by means of plate 64, the locking member 61 also being attached to element 60 at an angle with respect to release element 62. Side brackets 56 are provided to retain the various parts within a protected housing area and to permit guidance of displaceable roller 42 along its path.

In operation, the truck 69 guided by rollers 69' along the rail 70, suspended from the support 71 as is the arrangement 41, is preceded along the path of travel by the projection bar 68. Bar 68 engages the release element 62 forcing element 62 and in turn cylindrical element 60 and locking member 61 to pivot in the direction of arrow 67 against the force of the coil spring 63 until the lower end of the locking member 61 disengages the recess 66 in the appropriate bracket 46. Then, the carrier arm (not shown) of the truck 69 will enter the gap 53 between the laterally displaceable roller 42 and the stationary roller 43 causing roller 42 to be displaced in the direction of arrow 52. In turn, since roller 42 is journalled at plate 46' which is connected at either end to bracket 46, the bracket 46 will also pivot in the direction of arrow 52 about the pivot means 51. Since the end 58' of the coil spring situated on shaft 57 extends against brace 59 under tension, the pivotal movement of roller 42 will be executed resiliently against the force of coil spring 58, since the other end 58'' of this coil spring is stationarily seated at the under side of brace 65. Once the projection bar 68 has passed by, the release element 62 and in turn the cylinder element 60 will pivot about shaft 57 in the opposite direction from that of arrow 67, due to the seating under tension of the end 63'' of coil spring 63 against the plate 64 on the cylinder element 60, the other end 63' of such spring being seated under tension against the bracket 65. Upon the return of the element 60 to its normal position, the locking member 61 will be ready to engage the appropriate recess 66 at the lower end of the particular bracket 46. In the same way, after the connecting arm (not shown) of the truck 69 has passed through the gap 53, the resilient force of spring 58 exerted onto brace 59 will cause the brackets 46 and in turn the roller 42 to travel in the direction opposite to that of arrow 52 until roller 42 is once more in closed position with locking member 61 suitably engaging the appropriate recess 66.

It will be appreciated that even if the locking mechanism and release means disposed on shaft 57 were omitted, the resilient force of coil spring 58 would still maintain roller 42 in closed position under normal conditions, only to be moved to open position upon the force of the connecting arm (not shown) of the truck 69 acting thereagainst as such arm passes through the gap 53.

FIG. 5 illustrates clearly the positional relationship from above of the various elements, and it is seen that whereas the brackets 46 are interconnected not only by brace 59 but also brace 78 to insure proper movement of the various parts in unison, top bracket 75 in addition to shaft 57 maintain top members 47 in proper structural alignment.

The sectional view of the pivot means 51 on one side of the roller box arrangement 41 illustrates clearly that the pin 51' is suitably journalled in bearing 51" in a manner which will permit durable operation of the displaceable roller arrangement over extended periods of time without trouble.

A similar return roller arrangement to that shown in FIGS. 1–3 is illustrated in FIGS. 4 and 5, including the return roller 74 carried by the curved frame 73 which may be moved along the groove 76 of the angle arm 72 attached suitably to the roller box arrangement 41. The lock nut 77 advantageously serves to releasably fix the position of frame 73 in groove 76, whereby the roller 74 may accommodate the return section of the cable regardless of the tortuous path of travel of the return section of the cable.

FIG. 6 merely shows the position of roller 42 as the carrier arm passes through the gap 53, and the relationship of the release element 62 and the locking member 61 with respect to the brackets 46 in the pivoting about the axis of the shaft 57 and the axis of the particular pivot means 51 as the case may be.

In FIG. 7, on the other hand, a portion of a mineway is illustrated, the mineway 80 being curved in nature and being provided with a rail 81 suspended from the mine roof by connections 82, such rail accommodating the work truck or load truck in question and carrying a plurality of roller box arrangements 83 at various points along the path of the forward section 84 and return section 85 of the traction cable for the truck. The power means 86 is used to drive the cable and in turn the truck along the desired path with the forward section 84 changing to the return section 85 at a reversing pulley arrangement 87 disposed at the end of the path of travel and suitably reinforced by angularly positioned struts 88. It will be seen from FIG. 7 that where a curve is encountered in the path, a greater number of roller box arrangements 83 is utilized and that this will be true wherever a marked change in direction of the path of the cable is encountered, whether the same be a change in lateral direction or upwards or downwards.

Obviously, it is desirable to include at least one roller in the instant arrangement to receive the load of the cable passing therealong with a minimum of friction and wear on the adjacent parts. While it is also advantageous to provide three additional stationary rollers to form the guide means of the invention, whereby a minimum of friction and wear on the adjacent parts will be assured, especially in the case of a roller box guide arrangement placed at a curve in the mineway where changing forces are encountered on the cable so as to change, of course, the side or portion thereof which engages the guide means, it is also possible to employ a lesser number of rollers. Specifically, two rollers of the stationary type may be used, together with the displaceable roller or even one stationary roller may be used with the displaceable roller, where the bearing load of the cable to be accommodated will not extend in all transverse directions. In fact, the displaceable roller alone may be used where the direction of load is generally in only one direction, usually downwardly or laterally, with the remainder of the guide means being provided in the form of a deflector member of the type described hereinabove. All of such arrangements, however, should be such that the distance apart between the adjacent portions of the guide means in each instance is less than the diameter of the cable to be accommodated so that there is no chance of escape of the cable from the retained position thereof in the guide means.

Generally, the roller box guide means of the invention may be carried conveniently by the same support means to which the overhead rail for the truck is attached, although separate support means may be used if desired. The number of roller box guide means along the extent of the overhead rail, and in turn, the extent of the driving cable or traction cable for the truck will depend not only upon the weight and structure of the cable but also upon the amount of curving and bending of the mineway through which the cable is disposed. Naturally, the roller box guide arrangement must be situated out of the path of movement of the truck along the overhead rail yet surrounding the path of the traction cable.

Advantageously, in accordance with the construction of the present invention, an unimpeded guiding of the traction cable is attained such that the truck may pass the various spaced apart roller box guiding arrangements with ease and the tortuous path of the traction cable will be suitably accommodated by the guiding rollers and/or deflector members. The appropriate guiding roller and/or deflector member will engage suitably the traction cable to maintain the same along the desired path of travel throughout the course of the particular mining operations. Specifically, the horizontal forces from the tension of the cable which occur when the cable must pass around curved paths and the vertical forces which occur when the cable must pass upwardly and downwardly through the mineway, are decreased and more effectively uniformly distributed by reason of a suitable number of roller box guide arrangements mounted in spaced relation along the rail path.

Furthermore, by reason of the provision for a suitable number of roller boxes, along the rail path, any sagging or dragging of the traction cable along the floor of the mineway or any dragging along the ceiling thereof is avoided. It will be appreciated that these features contribute considerably to the preservation of the cable and decrease the wear and tear thereof, especially in terms of friction forces acting on the cable along its tortuous path.

Understandably, the number of roller box guiding arrangements in accordance with the invention required along any portion of the path of travel of the traction cable and truck will depend upon the angle of curvature therealong, whether such angle be in the horizontal plane or in the vertical plane, keeping in mind that binding and friction wear of the cable is to be avoided and instead suitable guiding of the cable within the roller boxes is to be promoted and facilitated.

What is claimed is:

1. Traction cable guide, for truck suspension-mounted upon an overhead rail and conducted along said rail by a traction cable connected thereto, which comprises a roller box having traction cable guide means disposed in a transverse plane with respect to the path of travel of the traction cable and positioned for surrounding and guidingly engaging the traction cable to maintain such cable in a substantially predetermined path through said plane, said cable guide means including one displaceable roller and three fixed position rollers mounted on said box with the axes of rotation thereof being disposed in said transverse plane such that when the displaceable roller is in closed position, the peripheries of all said rollers surround completely the path of the traction cable with the periphery of one roller being immediately adjacent the next and at a maximum distance apart less than the diameter of the cable to be accommodated, to prevent escape of the cable therebetween and jamming of such cable thereat, urging means in operative connection with said displaceable roller, said displaceable roller being normally urged by said urging means into closed position for guiding engagement with the traction cable thereat yet being movable to open position with sufficient clearance between said displaceable roller and the adjacent fixed position rollers to permit the connection between the truck and traction cable to pass along said path of travel through the transverse plane without obstruction with said displaceable roller and in turn the adjacent fixed position rollers thereat.

2. Guide according to claim 1 wherein said displaceable roller is pivotally mounted on its axis at a point remote from the path of travel of the traction cable to permit said displaceable roller to swing to open position with said sufficient clearance between such displaceable roller and the adjacent fixed position rollers.

3. Guide according to claim 1 wherein a locking mechanism is provided for said displaceable roller in operative connection therewith and having release means operatively connected with said locking mechanism and situated in the path of travel of the truck for release of said locking mechanism and in turn movement of said displaceable roller to open position only upon engagement of such truck with said release means.

4. Guide according to claim 1 wherein said urging means are resilient urging means provided in operative connection with said displaceable roller for normally urging said displaceable roller into closed position, yet yieldable under the force of the connection between the truck and traction cable to permit movement of said displaceable roller to open position for passage of such connection therepast.

5. Guide according to claim 4 wherein said urging means is a spring means.

6. Guide according to claim 1 wherein said displaceable roller is situated in said transverse plane under the path of the traction cable for supporting contact of said displaceable roller with the underside of the cable.

7. Guide according to claim 1 wherein said displaceable roller is situated in said transverse plane laterally of the path of the traction cable for unilateral supporting contact of said displaceable roller with the adjacent side of the cable.

8. Traction cable guide, for truck suspension-mounted upon an overhead rail and conducted along said rail by a traction cable connected thereto, which comprises a roller box having traction cable guide means disposed in a transverse plane with respect to the path of travel of the traction cable and positioned for surrounding and guidingly engaging the traction cable to maintain such cable in a substantially predetermined path through said plane, said cable guide means including a displaceable roller mounted on said box with the axis of rotation thereof being disposed in said transverse plane, the adjacent portions of the cable guide means including fixed position deflector means in said transverse plane such that when the displaceable roller is in closed position, the cable guide means including the fixed deflector means and said displaceable roller surround completely the path of the traction cable with the periphery of said displaceable roller being immediately adjacent the corresponding portions of the cable guide means including said fixed deflector means and at a maximum distance therefrom less than the diameter of the cable to be accommodated to prevent escape of the cable therebetween and jamming of such cable thereat, urging means in operative connection with said displaceable roller, said displaceable roller being normally urged by said urging means into closed position for guiding engagement with the traction cable thereat yet being movable to open position with sufficient clearance between said displaceable roller and the adjacent portions of the cable guide means including said deflector means to permit the connection between the truck and traction cable to pass along said path of travel through the transverse plane without obstruction with said displaceable roller and in turn the adjacent portions of said cable guide means including said deflector means thereat.

9. Traction cable guide, for truck suspension-mounted upon an overhead rail and conducted along said rail by a traction cable connected thereto, which comprises a roller box having four traction cable guide rollers with their axes of rotation being disposed in a transverse plane with respect to the path of travel of the traction cable and positioned for surrounding and guidingly engaging the traction cable to maintain such cable in a substantially predetermined path through said plane, one of said rollers being a displaceable roller and the other three rollers being stationarily positioned with respect to such path of travel, said displaceable roller being pivotally mounted on its axis at a point remote from said path of travel and being normally resiliently urged into closed position for guiding engagement with the traction cable thereat yet being movable to open position with sufficient clearance between said roller and the next adjacent roller to permit the connection between the truck and traction cable to pass along said path of travel through the transverse plane without obstruction with said displaceable roller and in turn the next adjacent roller thereat.

10. Guide according to claim 9 wherein a locking mechanism is provided for said displaceable roller having release means situated in the path of travel of the truck prior to the point in such path where the connection between the truck and traction cable reaches said displaceable roller for release of said locking mechanism and in turn movement of said displaceable roller to open position only upon engagement of such truck with said release means so that such truck may pass in an unhindered manner along such path.

11. Guide according to claim 10 wherein resilient spring urging means are provided in operative connection with said displaceable roller for normally urging said roller into closed position, yet yieldable under the force of the connection between the truck and traction cable once said release means have been engaged by such truck to permit movement of said roller to open position for passage of such connection therepast.

12. Guide according to claim 11 wherein the periphery of one of the stationary rollers represents the upper guiding limit of such path and the periphery of said displaceable roller represents the lower guiding limit of such path, said last mentioned two rollers having spaced apart parallel horizontal axes of rotation, and wherein the periphery of the other two of the stationary rollers represent the lateral guiding limits of such path, said other two stationary rollers having spaced apart parallel vertical axes of rotation, such that when the displaceable roller is in closed position the peripheries of all of said rollers surround completely the path of the traction cable with the periphery of one roller being immediately adjacent the next and at a maximum distance apart which is substantially less than the narrowest diameter of the cable to be accommodated to prevent escape of the cable therebetween and jamming of such cable thereat.

13. Guide according to claim 11 wherein the periphery of a first of the stationary rollers represents the upper guiding limit of such path and the periphery of a second of the stationary rollers represents the lower guiding limit of such path, said last mentioned two rollers having spaced apart parallel horizontal axes of rotation, and wherein the periphery of the third of the stationary rollers and the periphery of said displaceable roller represent together the lateral guiding limits of such path, said third stationary roller and said displaceable roller having spaced apart parallel vertical axes of rotation, such that when the displaceable roller is in closed position the peripheries of all of said rollers surround completely the path of the traction cable with the periphery of one roller being immediately adjacent the next and at a maximum distance apart which is substantially less than the narrowest diameter of the cable to be accommodated to prevent escape of the cable therebetween and jamming of such cable thereat.

14. Traction cable guide, for truck suspension-mounted upon an overhead rail and conducted along said rail by a traction cable connected thereto, which comprises a roller box having two adjacent traction cable guide rollers as well as fixed position deflector means, with said deflector means and the axes of rotation of said rollers being disposed in a transverse plane with respect to the path of travel of the traction cable and with said axes being perpendicular to one another, such that the periphery at one side of one of the rollers is immediately adjacent the periphery at the corresponding side of the other of the rollers, and such that the deflector means extend between the correspondingly opposite sides of said rollers which sides are remote from one another, said rollers and deflector means being positioned with respect to each other for surrounding and guidingly engaging the traction cable to maintain such cable in a substantially predetermined path through said plane, one of said rollers being a displaceable roller and the other roller being stationarily positioned with respect to such path of travel, said displaceable roller being pivotally mounted on its axis at a point remote from said path of travel and being normally resiliently urged into closed position for guiding engagement with the traction cable thereat yet being movable to open position with sufficient clearance between said roller and the other of said rollers at the peripheral portions thereof to permit the connection between the truck and traction cable to pass along said path of travel through the transverse plane without obstruction with said displaceable roller and in turn the other of said rollers thereat.

15. Traction cable guide according to claim 14 wherein a locking mechanism is provided for said displaceable roller having release means situated in the path of travel of the truck prior to the point in such path where the connection between the truck and traction cable reaches said displaceable roller for release of said locking mechanism and in turn movement of said displaceable roller to open position only upon engagement of such truck with said release means so that such truck may pass in an unhindered manner along such path.

16. Traction cable guide according to claim 14 wherein resilient spring urging means are provided in operative connection with said displaceable roller for normally urging said roller into closed position, yet yieldable under the force of the connection between the truck and traction cable once said release means have been engaged by such truck to permit movement of said roller to open position for passage of such connection therepast.

References Cited by the Examiner
UNITED STATES PATENTS
2,529,271  11/1950  Winter _____ 104—182 X FOREIGN PATENTS
77,589  11/1894  Germany.
609,643  10/1948  Great Britain.
940,000  10/1963  Great Britain.

ARTHUR L. LA POINT, *Primary Examiner.*